(12) United States Patent
Fujishima et al.

(10) Patent No.: US 7,030,525 B2
(45) Date of Patent: Apr. 18, 2006

(54) METHOD FOR MANUFACTURING MOTOR YOKE, MOTOR YOKE, AND MOTOR

(75) Inventors: Katsuhiro Fujishima, Kosai (JP); Kazunobu Kanno, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 0 days.

(21) Appl. No.: 11/064,288

(22) Filed: Feb. 23, 2005

(65) Prior Publication Data
US 2005/0200227 A1    Sep. 15, 2005

(30) Foreign Application Priority Data
Mar. 11, 2004    (JP)    ............................. 2004-069280

(51) Int. Cl.
*H02K 5/00*    (2006.01)
(52) U.S. Cl. ........................... 310/89; 310/216; 29/596
(58) Field of Classification Search .................. 310/89, 310/216–218, 254; 29/596–598
See application file for complete search history.

(56) References Cited

U.S. PATENT DOCUMENTS

| | | | | |
|---|---|---|---|---|
| 2,294,037 A | * | 8/1942 | Kucher | ............... 29/888.025 |
| 3,081,411 A | * | 3/1963 | Wiley | .......................... 310/254 |
| 3,694,909 A | * | 10/1972 | Hallerback | .................... 29/596 |
| 4,055,094 A | * | 10/1977 | Menke | ......................... 82/1.11 |
| 5,495,657 A | * | 3/1996 | Zeisner et al. | ................ 29/597 |

FOREIGN PATENT DOCUMENTS

JP    2003-225725    8/2003

* cited by examiner

*Primary Examiner*—Thanh Lam
(74) *Attorney, Agent, or Firm*—Marsh Fischmann & Breyfogle LLP

(57) ABSTRACT

A cylindrical portion of a motor yoke has a securing portion to secure a stator core at an axial section except the axial ends of the cylindrical portion. When manufacturing the yoke, at first, a work is prepared that corresponds to the yoke before the securing portion is formed. A mandrel, which includes a forming portion, is then inserted into the work. The forming portion has an outer diameter smaller than the inner diameters of the axial ends of the cylindrical portion. Subsequently, the axial section of the cylindrical portion on which the securing portion is to be formed is pressed with dies from radially outside of the cylindrical portion toward the forming portion, thereby displacing the pressed section of the cylindrical portion radially inward and forming the securing portion on the work. As a result, the motor yoke with high accuracy is manufactured while reducing a waste of machining.

12 Claims, 4 Drawing Sheets

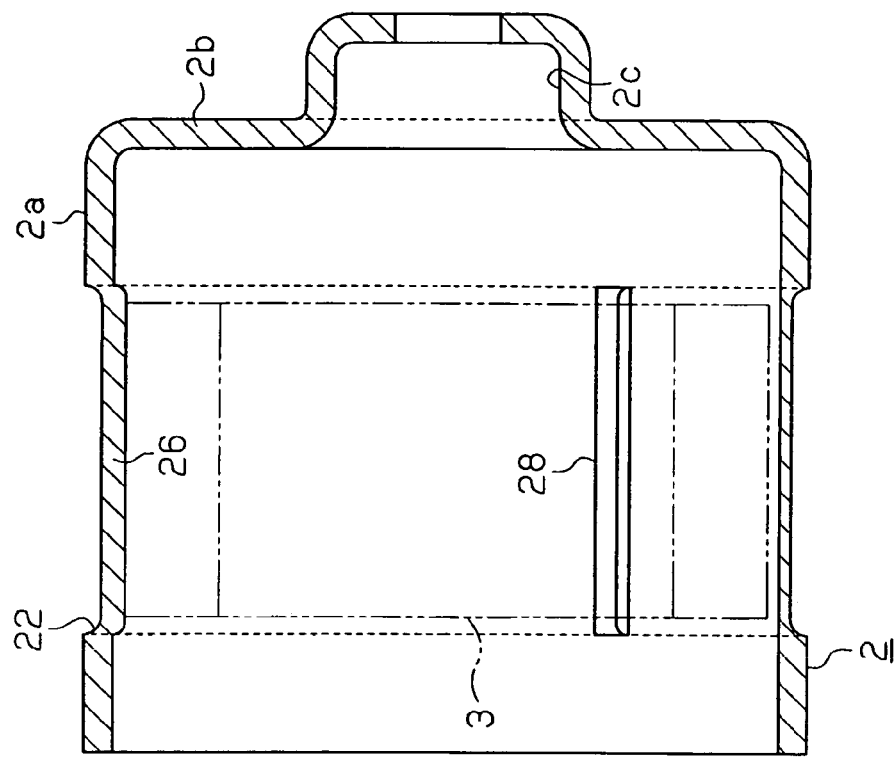
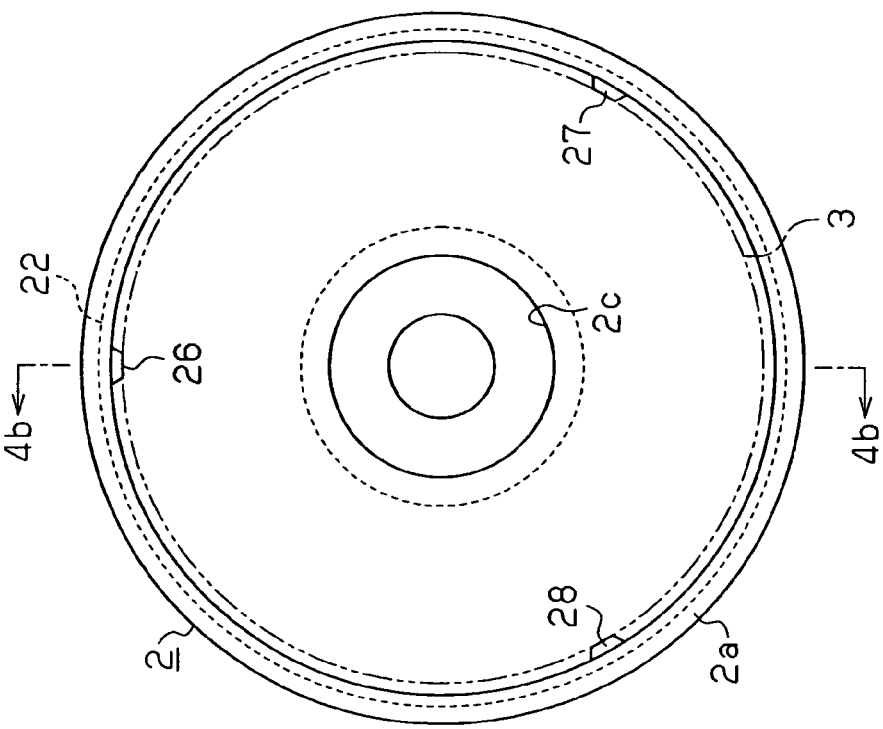

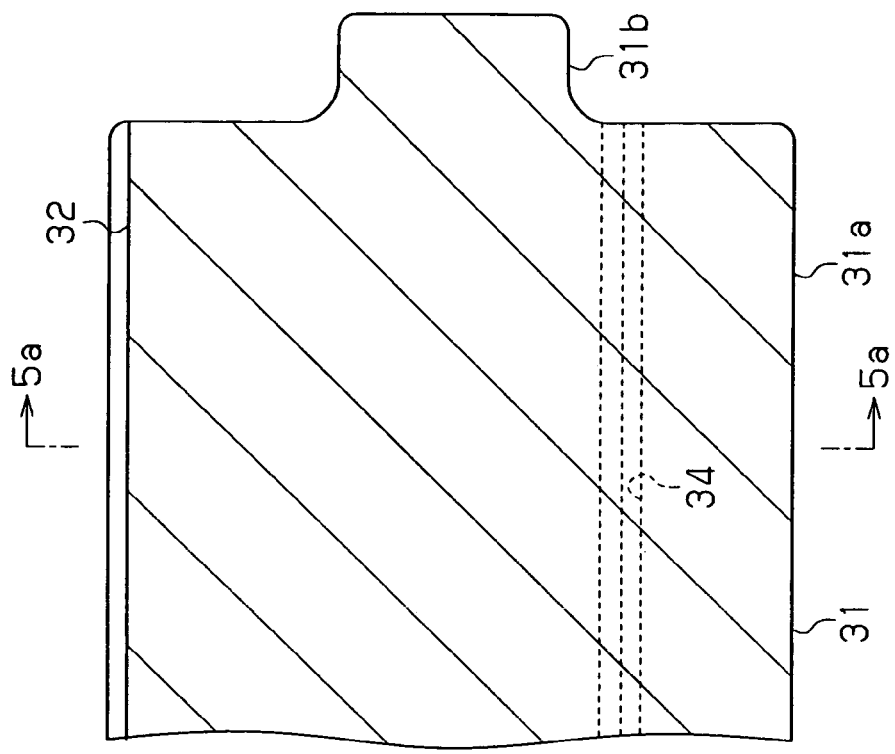
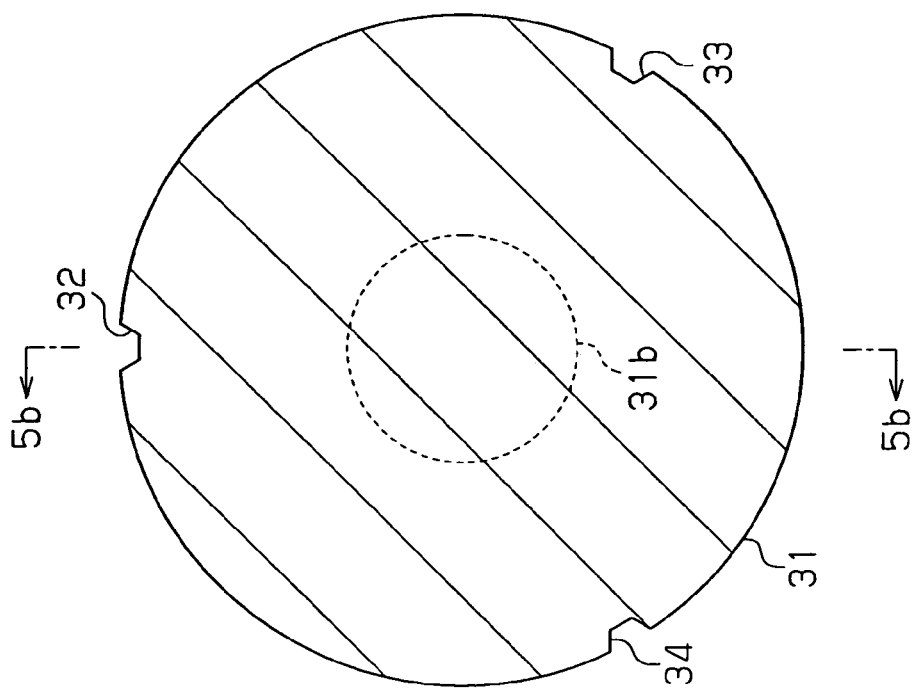

METHOD FOR MANUFACTURING MOTOR YOKE, MOTOR YOKE, AND MOTOR

BACKGROUND OF THE INVENTION

The present invention relates to a method for manufacturing a motor yoke, a motor yoke manufactured with this manufacturing method, and a motor equipped with the yoke.

A typical motor includes a cylindrical yoke and a cylindrical stator core, which is accommodated in the yoke. The stator core is secured to the yoke by press fitting or shrink fitting the stator core in the yoke. The yoke generally has a cylindrical portion and a bottom portion, which is integrally formed with the cylindrical portion to close one end of the cylindrical portion. The axially middle part of the cylindrical portion forms a securing portion to which the stator core is secured. If the dimensional accuracy of the securing portion is low, the circularity of the inner diameter of the stator core is decreased when press fitting or shrink fitting the stator core in the securing portion. This causes the air gap between the stator core and a rotor surrounded by the stator core to become uneven, which increases cogging and decreases the efficiency of the motor. Therefore, the dimensional accuracy of the securing portion needs to be improved.

The yoke is generally formed by drawing of plate material. The circularity of the cylindrical portion of the yoke formed by drawing is approximately 0.1 [mm]. To achieve the above mentioned accuracy, a technique for machining a tube disclosed in Japanese Laid-Open Patent Publication No. 2003-225725 may be applied. The technique disclosed in the above publication permits a tube having a weld bead such as an electric welded tube to be plastically deformed with a high dimensional accuracy.

More specifically, a swaging machine disclosed in the above publication includes a columnar mandrel, which is selectively inserted into the electric welded tube, a cylindrical die, which is selectively fitted to the mandrel, a pressing die, which selectively approaches and separates from the electric welded tube from radially outside of the mandrel, and a clamp, which secures the electric welded tube. A step is formed on the outer circumferential surface of the mandrel. The mandrel also includes a narrow tapered portion, which is connected to the step, a parallel forming part, which is connected to the tapered portion, and an escape portion, which is connected to the parallel forming part. The diameter of the escape portion is slightly smaller than that of the parallel forming part. The die includes a cylindrical inner surface the diameter of which is the same as the outer diameter of the electric welded tube after being formed, such that the outer diameter of the electric welded tube can be made equal to a desired outer diameter. When the mandrel is fitted to the die, a cylindrical space, which has the width that is the same as the thickness of the electric welded tube, is formed between the cylindrical inner surface and the parallel forming part, and a cylindrical space, which has the width that is greater than the thickness of the electric welded tube, is formed between the cylindrical inner surface and the escape portion. A tapered introducing portion is formed at the opening end of the die to introduce the electric welded tube into the die. The pressing die approaches the electric welded tube that has been machined using the mandrel and the die from radially outside and crushes the weld bead of the electric welded tube.

When machining the electric welded tube, at first, the electric welded tube is secured to the clamp. The die is then moved along the axial direction until the distal end of the electric welded tube contacts the tapered introducing portion of the die. On the other hand, the mandrel that is inserted in the die is inserted into the electric welded tube until the distal end of the electric welded tube contacts the step of the mandrel. After that, the die is slightly moved forward such that the die approaches the electric welded tube. This draws the electric welded tube along the tapered introducing portion. In addition, the inner rim of the distal end of the electric welded tube is pressed against the tapered portion of the mandrel so that a tapered surface is formed at the distal end. After that, by further advancing the die, a swaging process is performed so that the distal end of the electric welded tube is gradually drawn. In the swaging process, the distal end of the electric welded tube is pressed by the cylindrical inner surface of the die and the parallel forming part of the mandrel. Accordingly, the distal end is formed to have the desired outer diameter and the inner diameter. After the swaging process, the pressing die approaches the electric welded tube as the die is retracted. Accordingly, the weld bead of the inner surface of the electric welded tube is pressed against the parallel forming part and crushed. As a result, the inner surface of the distal end of the electric welded tube is made flat and smooth.

However, the technique disclosed in the above publication is suitable for machining the axial ends of a cylindrical body, but is not suitable for machining the securing portion located at the axially middle part of the motor yoke. That is, when machining the motor yoke using the technique of the above publication, the yoke needs to be continuously machined from the opening end of the cylindrical portion of the yoke to a section close to the bottom portion of the yoke. Therefore, not only the axially middle part of the yoke that will serve the securing portion, but also other part is machined in the same manner as the securing portion. This causes a waste of machining.

SUMMARY OF THE INVENTION

Accordingly, it is an objective of the present invention to manufacture a motor yoke with high accuracy while reducing a waste of machining.

To achieve the foregoing and other objectives and in accordance with the purpose of the present invention, a method for manufacturing a motor yoke, which has a cylindrical portion in which a stator core is accommodated, is provided. The cylindrical portion has a securing portion at an axial section except the axial ends of the cylindrical portion. The securing portion abuts against the stator core to secure the stator core. The securing portion projects radially inward with respect to the axial ends of the cylindrical portion. The method includes: preparing a work that corresponds to the yoke before the securing portion is formed; inserting a mandrel, which includes a forming portion to form the securing portion, into the work, wherein the forming portion either includes a portion that has a radial dimension smaller than the inner diameters of the axial ends of the cylindrical portion or has an outer diameter smaller than the inner diameters of the axial ends of the cylindrical portion; and pressing the axial section of the cylindrical portion on which the securing portion is to be formed with a die from radially outside of the cylindrical portion toward the forming portion of the mandrel, thereby displacing the pressed section of the cylindrical portion radially inward and forming the securing portion on the work.

The present invention also provides a motor yoke having a cylindrical portion in which a stator core is accommodated. The cylindrical portion has a securing portion at an axial section except the axial ends of the cylindrical portion. The securing portion abuts against the stator core to secure the stator core. The securing portion projects radially inward with respect to the axial ends of the cylindrical portion.

Further, the present invention provides a motor having a stator core and a yoke. The yoke has a cylindrical portion in which a stator core is accommodated. The cylindrical portion has a securing portion at an axial section except the axial ends of the cylindrical portion. The securing portion abuts against the stator core to secure the stator core. The securing portion projects radially inward with respect to the axial ends of the cylindrical portion. The stator core is secured to the yoke by press fitting or shrink fitting the stator core in the securing portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4(a) is a view illustrating a motor yoke according to a second embodiment of the present invention as viewed from the axial direction;

FIG. 4(b) is a cross-sectional view taken along line 4b—4b of FIG. 4(a);

FIG. 5(a) is a cross-sectional view taken along line 5a—5a of FIG. 5(b), illustrating a mandrel according to the second embodiment of the present invention; and FIG. 5(b) is a cross-sectional view taken along line 5b—5b of FIG. 5(a).

DETAILED DESCRIPTION OF THE PREFERRED EMBODIMENTS

Figure 1:
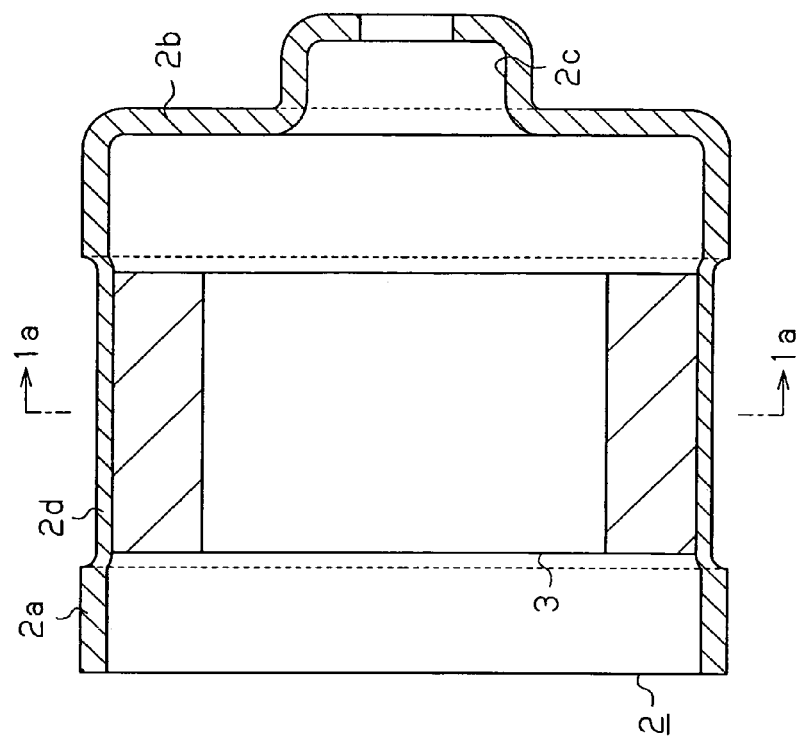
FIG. 1(a) is a cross-sectional view taken along line 1a—1a of FIG. 1(b), illustrating a motor yoke according to a first embodiment of the present invention.
FIG. 1(b) is a cross-sectional view taken along line 1b—1b of FIG. 1(a)

A first embodiment of the present invention will now be described with reference to FIGS. 1(a) to 3.

As shown in FIGS. 1(a) and 1(b), a motor 1 includes a cylindrical yoke 2 having one closed end. A stator core 3 is secured to the inner circumferential surface of the yoke 2. The stator core 3 includes an annular portion 3a and teeth 3b (twelve teeth 3b in this embodiment), which extend radially inward from the inner circumferential surface of the annular portion 3a. A coil C is wound about each tooth 3b. The distal ends of all the teeth 3b are arranged along a common circumference and form the inner diameter of the stator core 3. A rotor 4 is surrounded by the teeth 3b.

The stator core 3 is formed by assembling split core members 33. Each split core member 33 includes an arcuate portion 33a and one of the teeth 3b that extends from the arcuate portion 33a. The stator core 3 is formed by coupling the ends of the arcuate portions 33a of each adjacent pair of the split core members 33. The arcuate portions 33a that are coupled to each other form the annular portion 3a. The arcuate portions 33a may be coupled to each other by, for example, simply fitting with each other or welding. In a case where the arcuate portions 33a are fitted to each other, each arcuate portion 33a preferably has a fitting projection 33b and a fitting recess 33c, each having a semicircular cross-section. The fitting projection 33b is located at one of the ends of the arcuate portion 33a in the circumferential direction, and the fitting recess 33c is located in the other end. The fitting projection 33b of one of each adjacent pair of the arcuate portions 33a is fitted in the fitting recess 33c of the other one of the pair. This configuration permits each adjacent pair of the arcuate portions 33a to pivot with respect to each other. The split core members 33 are assembled to each other before the stator core 3 is secured to the yoke 2.

The yoke 2 has a cylindrical portion 2a and a bottom portion 2b, which is integrally formed with the cylindrical portion 2a to close one of axial ends of the cylindrical portion 2a. The center of the bottom portion 2b projects outward in the axial direction of the yoke 2. This forms a receiving recess 2c at the center of the inner surface of the bottom portion 2b. The receiving recess 2c accommodates a bearing (not shown), which supports a rotary shaft (not shown) of the rotor 4.

The inner diameters of the axial ends of the cylindrical portion 2a are greater than the outer diameter of the stator core 3. The axially middle part of the cylindrical portion 2a forms a cylindrical securing portion 2d, which abuts against the stator core 3 to secure the stator core 3. The entire circumference of the securing portion 2d projects, that is, displaced radially inward with respect to the axial ends of the cylindrical portion 2a. The inner diameter of the securing portion 2d is substantially equal to the outer diameter of the stator core 3. The axial length of the securing portion 2d is about half the axial length of the cylindrical portion 2a and is slightly longer than the axial length of the stator core 3. The radial thickness of the securing portion 2d is less than that of the axial ends of the cylindrical portion 2a.

When manufacturing the motor 1, the stator core 3 is press fitted in the securing portion 2d so that the stator core 3 is secured to the yoke 2. Subsequently, the rotor 4 is inserted into the stator core 3.

Next, a machining apparatus 5 for manufacturing the yoke 2 will be described.

Figure 2:
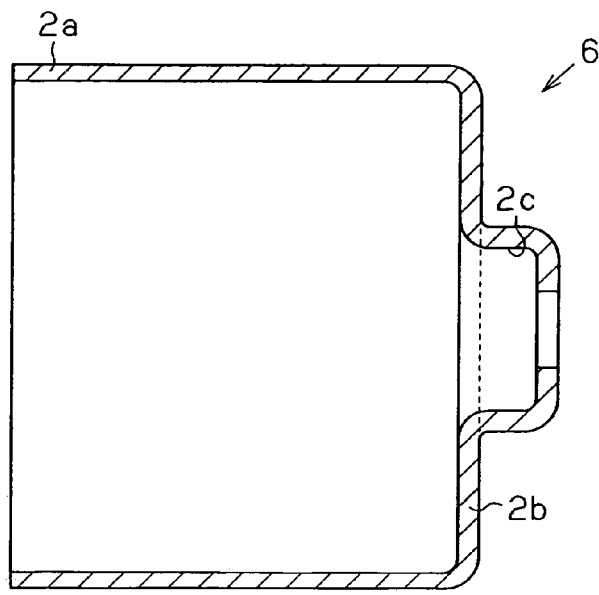
FIG. 2 is a cross-sectional view illustrating a work formed by drawing.

FIG. 2 shows a work 6 formed by drawing plate material. The machining apparatus 5 shown in FIG. 3 forms the securing portion 2d on the work 6 shown in FIG. 2 to obtain the completed product of the yoke 2. The work 6 corresponds to the yoke 2 before the securing portion 2d is formed and includes the cylindrical portion 2a, which has a constant diameter and thickness, and the bottom portion 2b, which has the receiving recess 2c and is integrally formed with the cylindrical portion 2a.

Figure 3:
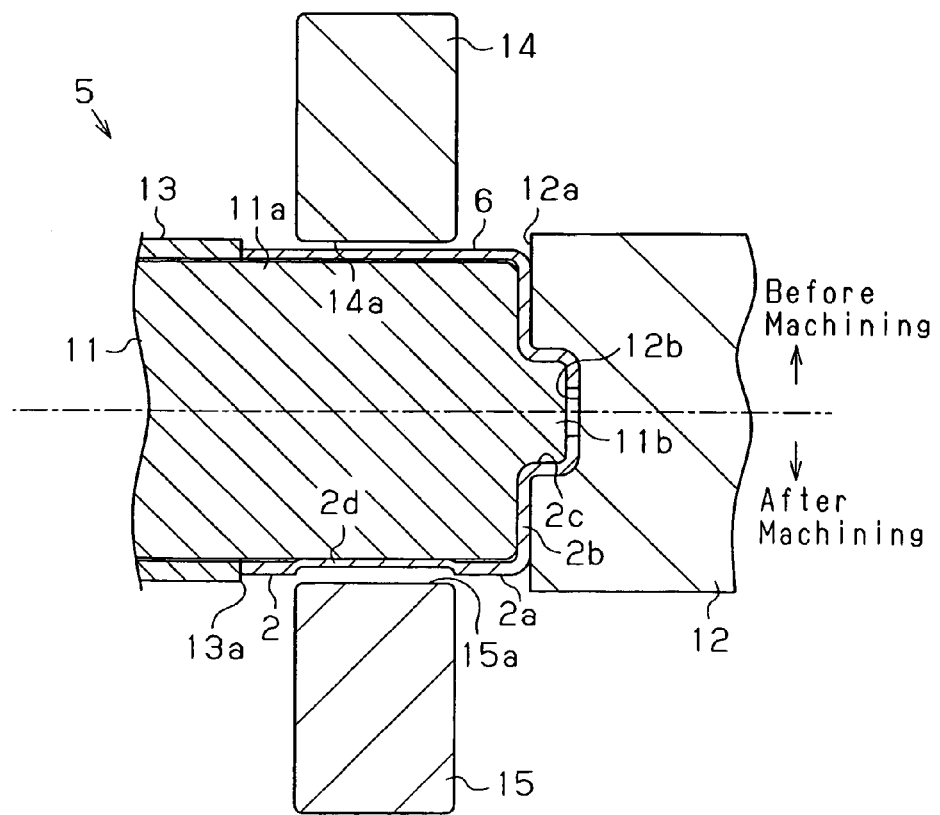
FIG. 3 is a cross-sectional view illustrating a machining apparatus.

As shown in FIG. 3, the machining apparatus 5 includes a mandrel 11, which is inserted into the work 6 shown in FIG. 2, a front clamp block 12 and a rear clamp block 13, which secure the work 6 to which the mandrel 11 is inserted at the axial ends, and two dies 14, 15, which press the work 6 from radially outside of the work 6.

The mandrel 11 includes a forming portion, which is a columnar portion 11a in this embodiment, and a bulge 11b located at the center of the distal end of the columnar portion 11a. The outer diameter of the columnar portion 11a is slightly smaller than the inner diameter of the work 6, and more specifically, is equal to the inner diameter of the securing portion 2d to be formed on the yoke 2. The outer diameter of the columnar portion 11a is constant in the axial direction. The bulge 11b has a shape corresponding to the inner circumferential surface of the receiving recess 2c such that the outer circumferential surface of the bulge 11b abuts against the inner circumferential surface of the receiving recess 2c.

The front clamp block 12 faces the bottom portion 2b of the work 6 to abut against the bottom portion 2b. The front clamp block 12 includes an abutment surface 12a, which abuts against the bottom portion 2b. A holding recess 12b is formed at the center of the abutment surface 12a. The projecting part of the bottom portion 2b, which forms the receiving recess 2c, is fitted in the holding recess 12b. The rear clamp block 13 faces the opening end of the work 6 to abut against the opening end. The rear clamp block 13 includes an abutment surface 13a, which abuts against the opening end of the work 6.

The dies 14, 15 face the outer circumferential surface of the cylindrical portion 2a and selectively approach and separate from the cylindrical portion 2a in the radial direction. The dies 14, 15 are provided to form the securing portion 2d of the yoke 2. The axial lengths of the dies 14, 15 are substantially the same as the axial length of the securing portion 2d. Each die 14, 15 has a forming surface 14a, 15a, which is selectively abut against the cylindrical portion 2a. The rim of each forming surface 14a, 15a is chamfered to be arcuate so that the securing portion 2d is smoothly formed. The dies 14, 15 abut against the axially middle part of the cylindrical portion 2a of the work 6 from radially opposite sides of the work 6 in which the mandrel 11 is inserted. The dies 14, 15 rotate about the axis of the mandrel 11 while pressing the cylindrical portion 2a toward the outer circumferential surface of the columnar portion 11a of the mandrel 11.

A method for manufacturing the yoke 2 using the machining apparatus 5 formed as described above will now be described. At first, the mandrel 11 is inserted into the work 6, which is formed by drawing. At this time, the bulge 11b of the mandrel 11 is inserted in the receiving recess 2c of the work 6. The bulge 11b is engaged with the receiving recess 2c by the abutment between the outer circumferential surface of the bulge 11b and the inner circumferential surface of the receiving recess 2c.

Next, the front clamp block 12 and the rear clamp block 13 secure the work 6 to prevent the work 6 from moving in the axial direction. More specifically, the front clamp block 12 and the rear clamp block 13 sandwich the work 6 from the axial ends and press the work 6 toward each other in the axial direction. At this time, the projecting part of the bottom portion 2b of the work 6 is fitted in the holding recess 12b of the clamp block 12 while the abutment surface 12a of the front clamp block 12 abuts against part of the bottom portion 2b other than the projecting part. At the same time, the abutment surface 13a of the rear clamp block 13 abuts against the opening end of the work 6. As a result, the work 6 is secured such that the work 6 is prevented from moving in the axial direction, and the axial length of the work 6 is maintained constant during the process described below.

Thereafter, the dies 14, 15 abut against the axially middle part of the cylindrical portion 2a from radially outside of the cylindrical portion 2a. The dies 14, 15 rotate about the axis of the mandrel 11 while pressing the cylindrical portion 2a toward the outer circumferential surface of the columnar portion 11a of the mandrel 11. The radial thickness of the section of the cylindrical portion 2a that is pressed with the dies 14, 15 is reduced while being deformed radially inward until the section abuts against the columnar portion 11a of the mandrel 11. Part of material forming the cylindrical portion 2a located at the section pressed with the dies 14, 15 moves toward axially opposite sides of the pressurized section, thereby increasing the radial thickness of the section of the cylindrical portion 2a that is not pressed with the dies 14, 15.

In this manner, the yoke 2, which has the cylindrical portion 2a on which the securing portion 2d is formed, is completed. The securing portion 2d has the circularity equivalent to the outer diameter of the columnar portion 11a of the mandrel 11. Thereafter, the dies 14, 15 are separated from the yoke 2 and the yoke 2 is released from the front clamp block 12 and the rear clamp block 13. The mandrel 11 is then pulled out of the yoke 2 and the completed product of the yoke 2 is removed.

The first embodiment provides the following advantages.

(1) Only the section of the yoke 2 to which the stator core 3 is secured, that is, only the section corresponding to the securing portion 2d located at the axially middle part of the yoke 2 is pressed radially inward with the dies 14, 15 against the columnar portion 11a of the mandrel 11. As a result, the securing portion 2d having high circularity equivalent to that of the columnar portion 11a of the mandrel 11 is formed on the yoke 2. Since only the section of the yoke 2 where the securing portion 2d is formed is plastically deformed, waste of machining is decreased.

(2) The inner circumferential surface of the securing portion 2d is located radially inward with respect to the inner circumferential surface of parts of the cylindrical portion 2a on axially opposite sides of the securing portion 2d. The inner diameter of the securing portion 2d is substantially equal to the outer diameter of the stator core 3 so that the stator core 3 is secured to the securing portion 2d. The inner circumferential surfaces of the axial ends of the cylindrical portion 2a, that is, the inner circumferential surfaces of parts of the cylindrical portion 2a where the securing portion 2d is not formed have inner diameters greater than the outer diameter of the stator core 3. Therefore, when inserting the stator core 3 into the yoke 2, the stator core 3 does not easily contact part of the cylindrical portion 2a other than the securing portion 2d. As a result, the stator core 3 is easily press fitted in the yoke 2, thus facilitating securing the stator core 3 to the yoke 2.

(3) The dies 14, 15 continuously press the cylindrical portion 2a along the circumferential direction while rotating about the cylindrical portion 2a. This forms the securing portion 2d having a high circularity on the cylindrical portion 2a. The entire inner circumferential surface of the securing portion 2d abuts against the outer circumferential surface of the stator core 3. Therefore, the abutment area between the inner circumferential surface of the securing portion 2d and the outer circumferential surface of the stator core 3 is large. This permits the securing portion 2d to reliably hold the stator core 3.

(4) Since the radial thickness of the securing portion 2d is thinner than the radial thicknesses of the axial ends of the cylindrical portion 2a, the stator core 3 is easily press fitted in the securing portion 2d. Although the radial thickness of the securing portion 2d is thin, the necessary rigidity of the securing portion 2d is achieved by press fitting the stator core 3.

(5) The work 6 is clamped by the front clamp block 12 and the rear clamp block 13 so that the axial length of the work 6 is maintained constant when forming the securing portion 2d. That is, the clamp blocks 12, 13 function as a restrictor for restricting the work 6 from extending in the axial direction so that the axial length of the work 6 is maintained constant. Therefore, when the dies 14, 15 pressurize the work 6, the material of the pressurized section is restricted from moving in the axial direction by an amount that is more than necessary. This ensures the pressurized section to abut against the columnar portion 11a of the mandrel 11. Thus, the yoke 2 having the desired shape and dimension is easily obtained as the machined yoke 2. In addition, the dimensional accuracy of the inner diameter of the securing portion 2d is further improved.

A second embodiment of the present invention will now be described. The differences from the first embodiment will be mainly discussed below with reference to FIGS. 4(a) to 5(b).

As shown in FIGS. 4(a) and 4(b), like the yoke 2 of the first embodiment, the motor yoke 2 of the second embodiment has a cylindrical form with one end closed. The yoke 2 has the cylindrical portion 2a and the bottom portion 2b, which is integrally formed with the cylindrical portion 2a to close one of axial ends of the cylindrical portion 2a. The receiving recess 2c that is the same as that of the yoke 2 of the first embodiment is formed at the center of the inner surface of the bottom portion 2b.

An annular recess 22 is formed on the outer circumferential surface of the cylindrical portion 2a. The annular recess 22 extends along the entire circumference of the outer circumferential surface of the cylindrical portion 2a. The annular recess 22 is located at a position corresponding to the securing portion 2d of the first embodiment, that is, at the axially middle part of the cylindrical portion 2a.

Securing projections 26 to 28 (three in this embodiment) project radially inward from the inner circumferential surface of the cylindrical portion 2a. The securing projections 26 to 28 constitute a securing portion that abuts against the stator core 3 to secure the stator core 3 and are displaced radially inward with respect to the axial ends of the cylindrical portion 2a. The securing projections 26 to 28 are arranged at equal angular intervals about the axis of the cylindrical portion 2a. The securing projections 26 to 28 extend along the axis of the cylindrical portion 2a on the inner circumferential surface of the axially middle part of the cylindrical portion 2a, in other words, on the inner circumferential surface of a section of the cylindrical portion 2a corresponding to the annular recess 22. The axial lengths of the securing projections 26 to 28 are about half the axial length of the cylindrical portion 2a and is slightly longer than the axial length of the stator core 3. The inner diameter of the cylindrical portion 2a, or more specifically, the inner diameter of the section of the cylindrical portion 2a except the securing projections 26 to 28 is greater than the outer diameter of the stator core 3, which is press fitted in the cylindrical portion 2a. On the other hand, an inscribed circle that passes through the distal ends of all the securing projections 26 to 28 is equal to the outer diameter of the stator core 3.

The yoke 2 of the second embodiment is formed by plastically deforming the work 6 shown in FIG. 2, which is the same as the first embodiment. A machining apparatus used in the second embodiment is substantially the same as the machining apparatus 5 of the first embodiment except that the machining apparatus is equipped with a mandrel 31 shown in FIGS. 5(a) and 5(b) instead of the mandrel 11 shown in FIG. 3.

As shown in FIGS. 5(a) and 5(b), the mandrel 31 of the second embodiment includes a forming portion, which is a columnar portion 31a in this embodiment, and a bulge 31b located at the center of the distal end of the columnar portion 31a. The outer diameter of the columnar portion 31a is substantially equal to the inner diameter of the cylindrical portion 2a of the work 6 shown in FIG. 2. The columnar portion 31a is selectively inserted into the work 6. Also, the axial length of the columnar portion 31a is equal to the axial length of the cylindrical portion 2a.

Grooves 32 to 34 (three in the second embodiment), which extend along the axis of the columnar portion 31a, are formed on the outer circumferential surface of the columnar portion 31a. The grooves 32 to 34 are arranged at equal angular intervals about the axis of the columnar portion 31a. The grooves 32 to 34 extend to the axial ends of the columnar portion 31a. The dimensions at portions corresponding to the grooves 32 to 34 in the radial direction of the columnar portion 31a are smaller than the diameter of the inner circumferential surface of the axial ends of the cylindrical portion 2a. The cross-sectional shapes of the grooves 32 to 34 correspond to those of the securing projections 26 to 28. More specifically, the depths of the grooves 32 to 34 are equal to the heights of the securing projections 26 to 28. A circle that passes the bottom portions of all the grooves 32 to 34 is equal to the inscribed circle that passes through the distal ends of the securing projections 26 to 28 and is smaller than the inner diameter of the yoke 2. The bulge 31b has a shape corresponding to the inner circumferential surface of the receiving recess 2c such that the outer circumferential surface of the bulge 31b abuts against the inner circumferential surface of the receiving recess 2c.

Although not shown in the drawings, the machining apparatus of the second embodiment includes two dies and front and rear clamp blocks, which are substantially the same as those of the machining apparatus 5 of the first embodiment. The dies selectively press the axially middle part of the cylindrical portion 2a of the work 6 radially inward. Accordingly, part of the material that forms the pressurized section of the cylindrical portion 2a enters the grooves 32 to 34 of the mandrel 31.

A method for manufacturing the yoke 2 using the machining apparatus formed as described above will now be described. At first, the mandrel 31 is inserted into the work 6 formed by drawing. At this time, the bulge 31b of the mandrel 31 is inserted in the receiving recess 2c of the work 6. The bulge 31b is engaged with the receiving recess 2c by the abutment between the outer circumferential surface of the bulge 31b and the inner circumferential surface of the receiving recess 2c.

Next, the front clamp block and the rear clamp block secure the work 6 to prevent the work 6 from moving in the axial direction in the same manner as the first embodiment. Thereafter, the dies abut against the axially middle part of the cylindrical portion 2a from radially outside of the cylindrical portion 2a. The dies rotate about the axis of the mandrel 31 while pressing the cylindrical portion 2a toward the columnar portion 31a of the mandrel 31. At this time, part of the material forming the section of the cylindrical portion 2a pressurized with the dies moves to fill the grooves 32 to 34 of the mandrel 31 and forms the securing projections 26 to 28. At the same time, part of the material is pressed toward the axially opposite sides of the pressurized section, thereby increasing the radial thickness of the section of the cylindrical portion 2a that is not pressurized with the dies.

In this manner, the yoke 2, which includes the cylindrical portion 2a having the annular recess 22 on the outer circumferential surface and the securing projections 26 to 28 on the inner circumferential surface, is completed. Thereafter, the dies are separated from the yoke 2 and the yoke 2 is released from the front clamp block and the rear clamp block. The mandrel 31 is then pulled out of the yoke 2 and the completed product of the yoke 2 is removed.

The second embodiment provides the following advantages in addition to the advantage (5) of the first embodiment.

(1) The columnar portion 31a of the mandrel 31 has the grooves 32 to 34, which extend along the axis of the mandrel 31. The mandrel 31, which has the grooves 32 to 34, is inserted into the cylindrical portion 2a of the work 6. In this state, the dies are rotated about the work and pressurize the cylindrical portion 2a of the work 6 continuously along the circumferential direction of the cylindrical portion 2a. As a result, part of the material forming the cylindrical portion 2a moves to fill the grooves 32 to 34 and forms the securing projections 26 to 28 for holding the stator core 3. Since the securing projections 26 to 28 are formed when the dies pressurize the cylindrical portion 2a continuously along the circumferential direction of the cylindrical portion 2a, three securing projections 26 to 28 are formed such that the inscribed circle that pass through all the distal ends of the securing projections 26 to 28 has high circularity. In addition, the securing projections 26 to 28 are formed at the section of the inner circumferential surface of the cylindrical portion 2a except the axial ends. Since the inner circumferential surface of the axial ends of the cylindrical portion 2a need not be machined, waste of machining is decreased.

(2) The securing projections 26 to 28 project from the inner circumferential surface of the yoke 2. The diameter of the inscribed circle that passes through the distal ends of all the securing projections 26 to 28 is substantially the same as the outer diameter of the stator core 3 to be held by the securing projections 26 to 28. The inner circumferential surfaces of the axial ends of the cylindrical portion 2a do not have the securing projections 26 to 28 and have the inner diameters greater than the outer diameter of the stator core 3. Therefore, when inserting the stator core 3 into the yoke 2, the stator core 3 does not easily contact the section of the circumferential surface of the yoke other than the securing projections 26 to 28. Furthermore, in the second embodiment, only the securing projections 26 to 28 contact the stator core 3. Therefore, as compared to the securing portion 2d of the first embodiment, the abutment area between the stator core 3 and the yoke 2 is small. As a result, the stator core 3 is more easily secured to the yoke 2.

(3) Since the grooves 32 to 34 are formed along the entire length of the columnar portion 31a of the mandrel 31, the mandrel 31 is easily pulled out of the yoke 2 after the securing projections 26 to 28 are formed.

The above embodiments may be modified as follows.

In the first embodiment, the radial thickness of the securing portion 2d need not be thinner than the radial thickness of the axial ends of the cylindrical portion 2a.

In the first embodiment, the dies 14, 15 continuously pressurize the work 6 along the circumferential direction of the work 6. However, the dies 14, 15 may be designed to partially pressurize the outer circumferential surface of the work 6.

In the second embodiment, three securing projections 26 to 28 are formed. However, the number of the securing projections 26 to 28 may be four or more. That is, the number of the grooves 32 to 34 of the mandrel 31 need not be three, but may be four or more.

In the second embodiment, the radial thicknesses of the sections of the cylindrical portion 2a corresponding to the securing projections 26 to 28 may be thinner than the radial thicknesses of the axial ends of the cylindrical portion 2a. With this structure, the stator core 3 is more easily press fitted in the yoke 2.

In the second embodiment, the grooves 32 to 34 are formed along the entire length of the columnar portion 31a of the mandrel 31. However, the grooves 32 to 34 need not extend to the proximal end of the columnar portion 31a, but may be formed to extend at least to the distal end of the columnar portion 31a, that is, to the end corresponding to the bottom portion 2b of the work 6, which is attached to the mandrel 31. In other words, the grooves 32 to 34 may have any length as long as the grooves 32 to 34 extend at least to the end at the rear with respect to a direction along which the mandrel 31 is pulled out from the yoke 2 after machining.

In the first and second embodiments, the shape of the yoke 2 is not limited to the one shown in figures, but may be anything as long as the section to which the stator core 3 is secured is cylindrical. In this case, according to the mandrel 31 of the second embodiment, the grooves 32 to 34 may have any form as long as the machined yoke 2 can be pulled out of the mandrel 31.

In the first and second embodiments, the front clamp block 12 and the rear clamp block 13 may be omitted, and the work 6 may be machined without being clamped.

In the first and second embodiments, the cylindrical portion 2a may be rotated with respect to the dies 14, 15 to machine the work 6 instead of rotating the dies 14, 15 with respect to the cylindrical portion 2a. Alternatively, both the cylindrical portion 2a and the dies 14, 15 may be rotated to machine the work 6.

In the first and second embodiments, the stator core 3 may be secured to the cylindrical portion 2a by shrink fitting instead of press fitting.

The stator core 3 need not be formed by assembling split core members 33, but may be formed as an integral body.

Therefore, the present examples and embodiments are to be considered as illustrative and not restrictive and the invention is not to be limited to the details given herein, but may be modified within the scope and equivalence of the appended claims.

The invention claimed is:

1. A method for manufacturing a motor yoke, which has a cylindrical portion in which a stator core is accommodated, wherein the cylindrical portion has a securing portion at an axial section except the axial ends of the cylindrical portion, the securing portion abuts against the stator core to secure the stator core, and the securing portion projects radially inward with respect to the axial ends of the cylindrical portion, the method comprising:

preparing a work that corresponds to the yoke before the securing portion is formed;

inserting a mandrel, which includes a forming portion to form the securing portion, into the work, wherein the forming portion either includes a portion that has a radial dimension smaller than the inner diameters of the axial ends of the cylindrical portion or has an outer diameter smaller than the inner diameters of the axial ends of the cylindrical portion; and pressing the axial section of the cylindrical portion on which the securing portion is to be formed with a die from radially outside of the cylindrical portion toward the forming portion of the mandrel, thereby displacing the pressed section of the cylindrical portion radially inward and forming the securing portion on the work.

2. The method according to claim 1, wherein, when the cylindrical portion is pressed with the die, at least one of the die and the work is rotated about an axis of the mandrel with respect to the other one of the die and the work, the die thereby continuously presses the cylindrical portion along the circumferential direction such that an annular securing portion is formed as the securing portion, and the annular securing portion is displaced radially inward along the entire circumference of the cylindrical portion.

3. The method according to claim 1, wherein the forming portion has a plurality of grooves, which extend along an axis of the mandrel, when the cylindrical portion is pressed with the die, the cylindrical portion is deformed such that part of material forming the cylindrical portion fills the grooves, thereby forming a plurality of projections, which extend along an axis of the work, as the securing portion.

4. The method according to claim 3, wherein, when the cylindrical portion is pressed with the die, at least one of the die and the work is rotated about the axis of the mandrel with respect to the other one of the die and the work, the die thereby continuously presses the cylindrical portion along the circumferential direction.

5. The method according to claim 3, further comprising pulling the mandrel out of the completed yoke obtained by forming the securing portion, wherein the mandrel has an end at the rear with respect to a direction along which the mandrel is pulled with respect to the yoke, and the grooves extend to the end of the mandrel.

6. The method according to claim 3, wherein the yoke has a bottom portion, which closes one of axial ends of the cylindrical portion, the mandrel has an end that corresponds to the bottom portion when the mandrel is inserted in the work, and the grooves extend to the end of the mandrel.

7. The method according to claim 1, further comprising clamping the work with two blocks from axially opposite sides of the work, when the cylindrical portion is pressed with the die.

8. The method according to claim 1, further comprising restricting the work from extending in the axial direction with a restrictor so that the axial length of the work is maintained constant, when the cylindrical portion is pressed with the die.

9. The method according to claim 1, wherein the die presses the cylindrical portion such that the radial thickness of the securing portion becomes thinner than the radial thicknesses of the axial ends of the cylindrical portion.

10. The method according to claim 1, further comprising securing the stator core to the yoke by press fitting or shrink fitting the stator core in the securing portion.

11. The method according to claim 10, wherein the stator core is formed by assembling a plurality of split core members, the method further comprising assembling the split core members with each other before securing the stator core to the yoke.

12. The method according to claim 11, wherein each split core has an arcuate portion in which the tooth extends, wherein a fitting projection is provided at one of the ends of each arcuate portion in the circumferential direction, and a fitting recess is provided at the other end, wherein said assembling the split core members with each other includes fitting the fitting projection of one of each adjacent pair of the arcuate portions to the fitting recess of the other arcuate portion so that each adjacent pair of the arcuate portions are permitted to pivot with respect to each other.

* * * * *